United States Patent

[11] 3,630,361

[72] Inventor Richard T. Keating
715 South 25th Avenue, Bellwood, Ill. 60104
[21] Appl. No. 837,260
[22] Filed June 27, 1969
[45] Patented Dec. 28, 1971

[54] FILTER-MELTER FOR COOKING FAT
7 Claims, 4 Drawing Figs.

[52] U.S. Cl. ................................................ 210/85,
210/136, 210/184, 210/DIG. 8, 210/134
[51] Int. Cl. .................................................. B01d 35/16,
B01d 35/18
[50] Field of Search .................................................. 210/85,
167, 136, 143, 149, 184, 186, 196, 134, DIG. 8

[56] References Cited
UNITED STATES PATENTS

| | | | |
|---|---|---|---|
| 2,345,697 | 4/1944 | Boyce | 210/184 X |
| 3,088,595 | 5/1963 | Robb | 210/456 X |
| 3,263,818 | 8/1966 | Gedrich | 210/167 X |
| 3,279,605 | 10/1966 | Shepherd | 210/167 X |
| 3,368,682 | 2/1968 | Boots | 210/167 X |
| 3,504,798 | 4/1970 | Anetsberger | 210/184 X |

Primary Examiner—Samih N. Zaharna
Attorney—Rummler & Snow

ABSTRACT: A combined filter and melter, for use with food fryers, having a heated circulatory and filter system adapted to remove used cooking fat from a fryer, subject it to a filtering, decolorizing and deodorizing treatment, and return the reconstituted fat to the fryer. Plugging of the circulatory system due to residual fat accumulations is prevented and makeup or new fat or shortening in solid form can be added and properly melted for ultimate return to the fryer. In one embodiment the conduits, pump and valves of the circulatory system and the upstream side of the filter zone are provided with controlled heaters and means included to indicate when any solid fat in the system or filter zone is melted and circulation and/or filtering can begin. The liquid fat entering the filter zone is directed tangentially to the interior wall thereof to break up and disperse any particulate solid filter medium that may be used in the filter zone.

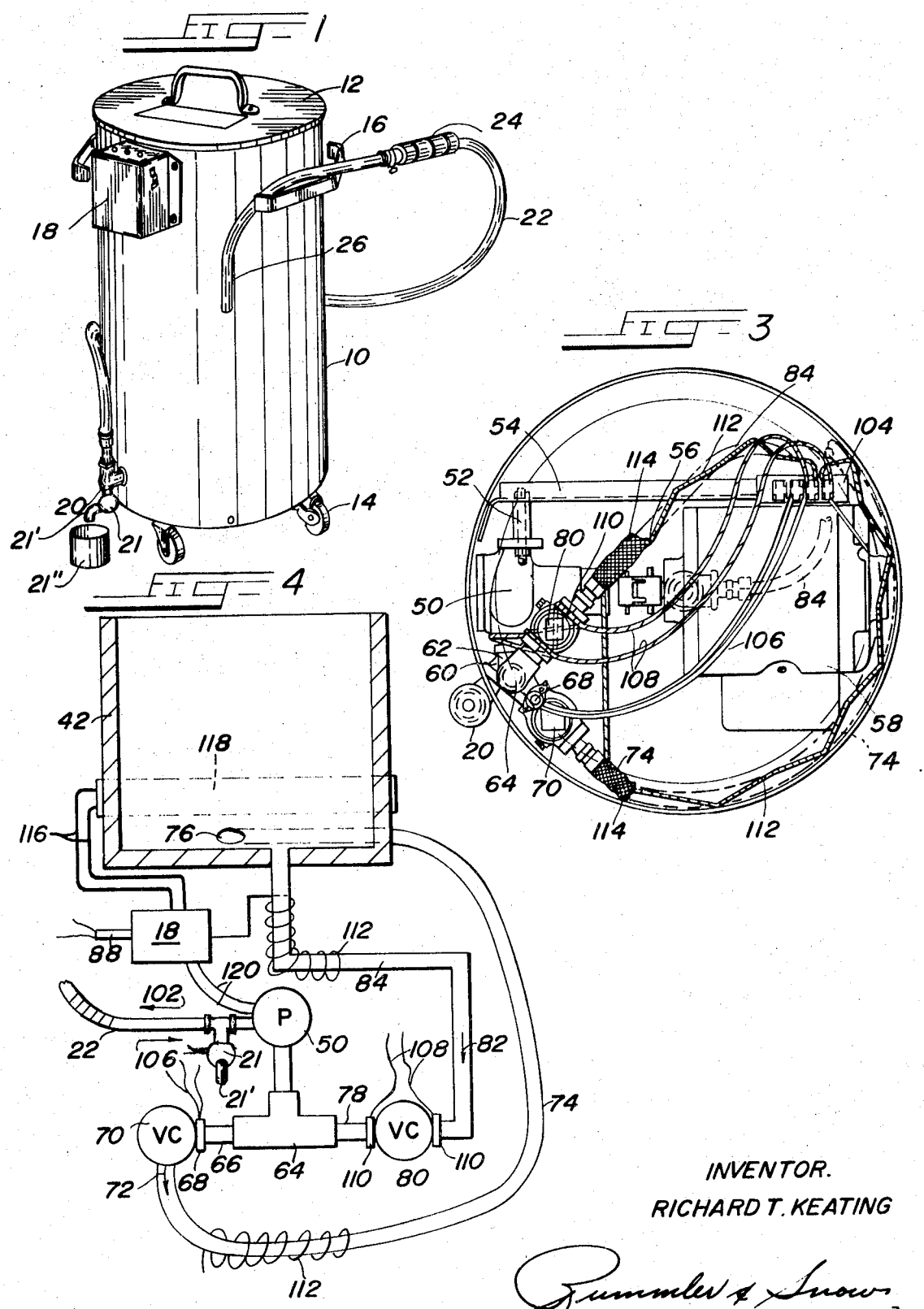

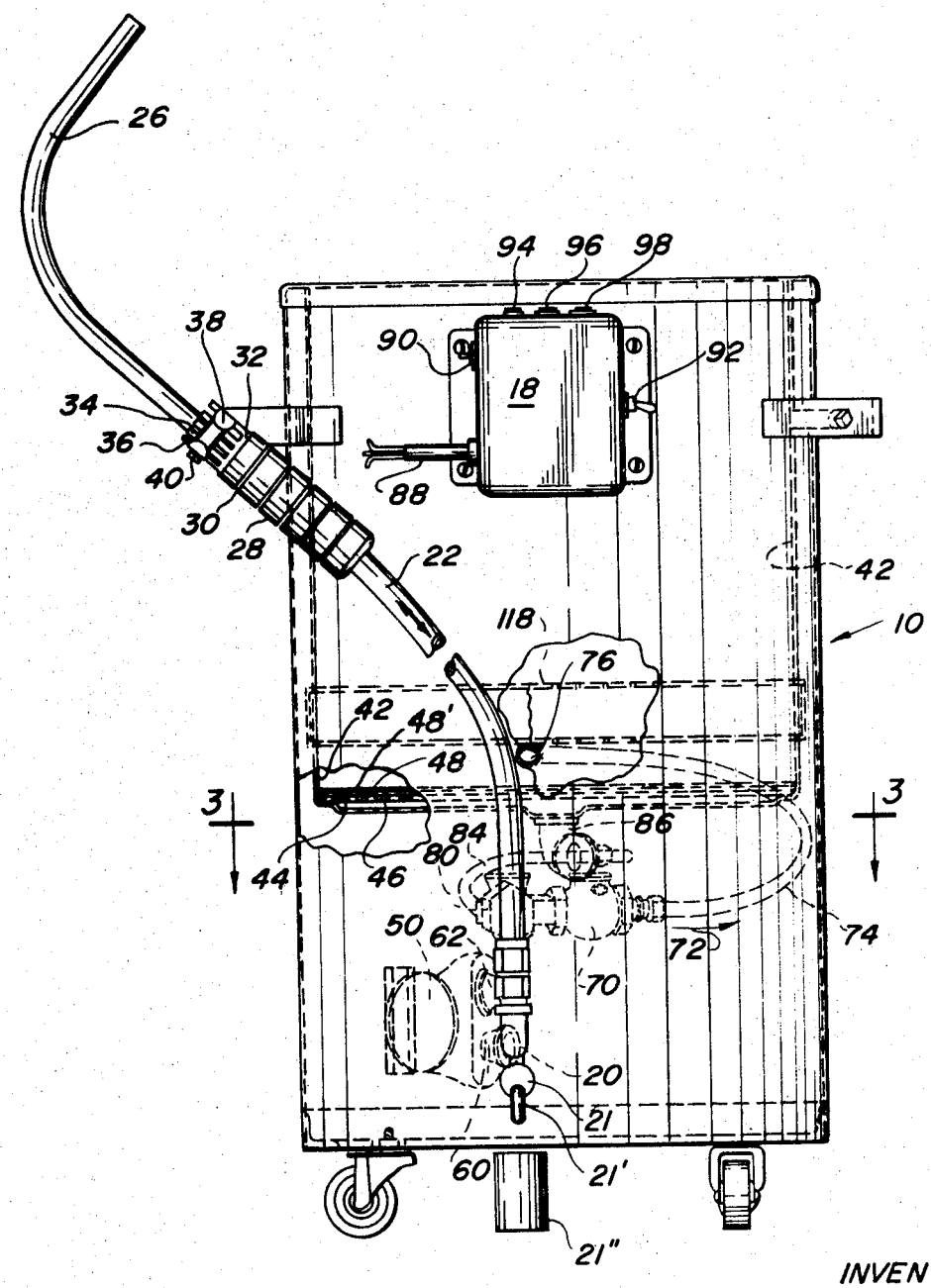

FILTER-MELTER FOR COOKING FAT

BACKGROUND OF THE INVENTION

Submergible resistance heating coils and sheath-type heaters have been used in chemical apparatus involving the handling of liquid heat exchange materials such as cooking fats which are subject to heat decomposition and are solids at ambient temperatures, particularly where the operating conditions are critical. Heaters of the submergible type are used in combination with control switches to properly heat and circulate small amounts of normally liquid cooking oils, as in corn-popping machines.

In deep fat fryers employing large quantities of fat or cooking shortening there is the continuous problem of contamination of the cooking medium with the byproducts of heat decomposition of food particles and of the cooking medium itself due to overheating. The fat must be reconstituted by filtering or replacement because the accumulated byproducts impart discoloration, odor and rancidity, which also have undesirable effects on the food being cooked. The filtering can be in situ by convention circulation through a filter wall or by a separate filter apparatus. There are the constant problems of cleanliness, slow filter rates, accumulations of solid fat in the valves, recesses, pumps and conduits and the time delays incurred in melting replacement fat and in starting up these devices.

Although a number of auxiliary filter devices have been developed for pumping the hot liquid fat from the fryer through a separate filter zone, the foregoing problems are not overcome even with the application of a vacuum to increase the flow rate of the fat through the filter medium. In some devices bayonet-type electrical heaters are used at critical points in the piping system and reverse flow means are used in others to circulate the fat to and from the unit and through the filter element. One such system is described in U.S. Pat. 3,263,818 by J. Gedrich using a reversible motor connected to a pump within a conduit system including a two-position valve wherein the hot fat can be pumped from the fryer and passed downwardly through the filter zone and then reversed, after a prescribed time, to pump the clean liquid back to the deep fryer.

In the Gedrich portable oil-filtering apparatus, the two-position valve is operated by a linkage connected to a switch which reverses the motor and the direction of flow through the third pipe and a flexible hose for withdrawal from or discharge into the deep fat fryer. The switch is moved to the "in" position which places the valve to its first position and the motor operates the pump to draw fat through the flexible hose, through the valve and into the filter tank. Movement of the switch to the "out" position, reverses the motor and pump, moves the valve to the second position and the flow is from the second pipe through the second position of the valve, out the third pipe and flexible hose for return to the fryer.

In practice, it has been found that even though the operators become familiar with the functions of the filter devices of this type, a great share of the difficulty comes from the manner in which solid shortening is incorporated in the system. The operators usually put the solid shortening into the fryer and turn on the heat to melt the shortening. This invariably results in scorching the inside of the fryer because the heaters are turned to high heat. A scorched fryer is difficult to clean and the resultant decomposed fat overloads the filter system and a totally unsatisfactory operation results.

SUMMARY OF THE INVENTION

The instant invention comprises an improvement over the Gedrich apparatus to overcome these problems wherein the two-way valve and switch linkage are eliminated and a simplified system of discharge and intake conduits is provided with suitable thermostatically controlled heating elements in combination with check valves whereby the apparatus is transformed into an easy-to-use filter and melter. Also provision is made to heat the filter zone and the inlet conduit to this zone discharges tangentially into the interior to break up and agitate any particulate filter medium used therein. The system includes self-cleaning check valves, one or both of which can be heated. A sump is provided at a low point in the inlet and discharge side of the system to accumulate residual fat drained from the inside of the filter and from the discharge and inlet hose to eliminate the need for heating this hose. The present apparatus eliminates the need for cleaning solid fat from the filter at startup and provides a convenient scorchless melter for added solid fat or shortening.

Accordingly, this invention concerns a filter heater which is adapted to function as a filter for the used fat in a fryer to clean and reconstitute the fat for reuse and discharge back to the fryer and also function as a heater to melt fresh solid fat blocks without scorching that are used to replenish the heating and cooking medium of the fryer.

More particularly, in accordance with this invention a unitized portable filter-heater is provided having an oil vessel with a bottom filter element and drain connected to a heated discharge line and check valve connected to a reversible motor-driven pump and a heated inlet line connected to the pump through a second check valve and directed to cause the fat to empty tangentially into the oil vessel above the filter element. A flexible hose is connected to the pump through which used fat can be withdrawn from the fryer to the oil vessel and out of which filtered and reconstituted fat is discharged both to the fryer or to disposal. Means are provided to directly or indirectly heat all parts, that is, the oil vessel contents, the discharge and inlet lines and the discharge check valve to operative temperatures and the system is provided with a sensing element located just ahead of the inlet check valve and the system includes means to indicate when the heater elements are on, when the system is up to temperature and when the pump is operating so that unskilled operators can easily and properly use the device.

DESCRIPTION OF THE DRAWINGS

A preferred and illustrative embodiment of the invention is shown in the drawings wherein:

FIG. 1 is a perspective view of the filter heater of this invention;

FIG. 2 is an enlarged view partly in section and partly in phantom to show the relationship of the parts;

FIG. 3 is a cross-sectional view, also partly in phantom, to show the heater system; and FIG. 4 is a diagram to show the conduit connections and the electrical elements in their relationship in accordance with the invention.

THE PREFERRED EMBODIMENT

Referring first to FIG. 1, there is shown the filter heater comprising the cylindrical cabinet 10 having an open top with the cover member 12 thereon. The cabinet is equipped with suitable casters 14 or the like for ready portability. Suitable handles 16 are provided near the top of the cabinet and the control box 18 is conveniently located at one side.

A drain connection 20, leading to a normally open solenoid valve 21 at the low point in the piping system, to be described hereafter, is provided at the bottom and exteriorly of the cabinet and is connected by suitable means to the flexible hose 22 having the wooden insulating handle 24 and the L-shaped nozzle 26. As shown the handle 16 serves as a bracket to hold the hose and nozzle adjacent the device when it is not in use.

Referring to FIG. 2, the handle 24 is shown to have segments 28 formed by the spaced circumferential grooves 30 and having the reduced end 32, of lesser diameter, with the longitudinal serrations 34 therein forming a series of radially spaced fingers 36 around which the clamp 38 engages. The fingers 36 are slightly flexible and the clamp 38 holds them against the nozzle 26 at any desired position therealong. The clamp 38 is a typical hose clamp operated by the threaded bolt 40.

The cabinet 10 houses the oil vessel 42 therein which is designed to contain the fat to be filtered or solid fat blocks to be melted. A transverse wall 44 spaced above the bottom of the oil vessel is perforated, as at 46, and supports a paper filter element 48. Particular absorbent filter media such as diatomaceous earth, here shown as the layer 48', can be used in the vat 42 for decolorization and absorption of rancidity and the like products of the thermal decomposition of the fat and the food that has been cooked or fried by the fat to be treated in the device. The filter paper 48 can be held in place by a split ring clamp such as described in Gedrich U.S. Pat. No. 3,263,818.

The lower part of the cabinet 10 has a compartment housing the pump 50 suitably mounted by means of the bracket 52 to the cross support member 54 (see FIG. 3). The pump 50 is connected through the drive coupling 56 to the reversible motor 58 and has one of its inlet or discharge ports 60 connected to the drain connection 20, which may be the center leg of a T between the pump and the hose 22. The other inlet-discharge port 62 of the reversible pump 50 is connected to the T-conduit or manifold 64. The discharge ports and the T-conduit can be so-called street elbows and T-connectors having inside diameters of about one-half in. to illustrate. The T-conduit 64 (see FIG. 4) is connected on one side by means of the conduit 66, having the thermostat 68 therein, to the check valve 70 which allows the fat to flow only in the direction of the arrow 72 in the discharge or drain conduit 74 with which it is connected. The discharge tube extends in a nonrestricted curve to the side of the lower compartment and thence tangentially along the bottom side of the oil vessel 42 to the discharge opening 76 which is adapted to discharge the liquid fat tangentially along the inside wall of the vessel at a point above or on one side of the filter element 48.

The other side of the T-conduit 64 is connected by means of the conduit 78 through the check valve 80 which is adapted to allow flow only in the direction of the arrow 82 in the suction input conduit 84 to which it is connected. The other end of the suction conduit 84 is connected through the bottom wall 44 of the vessel by means of the 90° elbow 86 as the drain for the vessel. This outlet can be located at any desired place on the opposite side of the filter from the opening 76 or as illustrated in the bottom wall of the vessel and is preferably substantially located from the filter wall with the filter wall being recessed at the point of entry into the elbow to provide for complete drainage of the liquid fat.

The electrical components of the filter-melter of this invention are connected to a suitable electrical outlet by means of a power cord 88 leading to the control box having the "ON" and "OFF" toggle switch 90 on one side and the three-position toggle switch 92 on the opposite side. The control box 18 has the colored indicator lights 94 (red), 96 (white), and 98 (yellow) on the top side for visibility. The circuitry, only parts of which will be described, is so connected that the switch 90 controls the fat-melting heater to be later described. Turning the switch 90 to ON position activates the melting heater and the yellow light 98 comes ON to show that the heat for melting is being applied. The switch 92 controls the motor 58. In the neutral position of the switch 92, the motor 58 receives no current; in the "fill" position of the switch 92, the motor 58 turns the pump 50 so that the delivery and withdrawal hose 22 becomes a suction hose and the fat can be drawn from a fryer (not shown) into the pump in the direction of the arrow 100 (FIG. 4); and, in the "discharge" position of the switch 92, the motor and pump are reversed so that the suction tube 84 draws the liquid fat from below the filter and out through the delivery and withdrawal hose 22 in the direction of the arrow 102, for return to the fryer.

The red light 94 ON shows that power is being supplied to the filter-melter, i.e., it is connected to a powerline, and the white light 96, which is controlled by the thermostat 68, when ON, indicates that the filter is ready for use, i.e., the fat in the filter system is melted.

Referring to FIGS. 3 and 4, suitable leads (not shown) are provided from the control box 18 to the connector strip 104 fastened to and insulated from the support 54. From the connector strip a first pair of leads 108 connect to the strip heaters 110 on each side of the check valve 80. A second strip heater 112 is coiled around the discharge tube 74 and also around the suction tube 84 and each of these tubes is wrapped with a woven tubular asbestos sheath 114. These strip heaters 110 and 112 are energized whenever the filter is turned on, that is supplied with electric current, and function to assure that the pumping system will not be clogged by solidified fat. The leads 116 connect to the main fat melter band heater 118 located around the outside of the vessel 42 just above the inlet 76 and the supply of current to these leads is controlled by the switch 90. The connection between the control box and the motor 58 is illustrated by the leads 120.

The operation of the device is as follows: At the startup under conditions wherein the cooking fat in a fryer needs to be filtered, the filter-melter is moved alongside and the nozzle 26 is immersed into the used hot liquid fat. The filter-melter is connected to an electric supply line and when the white light comes on, the switch 92 is turned to the "fill" position. The pump 50 pulls the liquid fat through the withdrawal hose 22 in the direction of the arrow 100. The check valve 70 allows the fat to flow in the direction of the arrow 72 in the discharge conduit 74 while the check valve 80 prevents any flow into the suction conduit 84.

The vessel 42 has a capacity at least as great as that of the fryer and when the latter is empty, the former is filled. During the transfer of the hot fat from the fryer to the filter, the fat enters the filter vessel 42 tangentially through the opening 76 and thus breaks up and agitates the filter powder 48' at the bottom of the vessel so that the powder can permeate the liquid fat as it fills the vessel.

As soon as the fryer is empty, the switch 92 can be turned past the neutral position to the "discharge" position, reversing the motor 52 and the pump 50 and the fat is drawn through the filter, out the suction or drain conduit line 84, through the check valve 80 and through the pump and delivery hose 22 in the direction of the arrows 82 and 102. The fryer is now filled with the cleaned fat and ready for operation.

Inspection of the fat withdrawn from the fryer may indicate that it has reached the end of its useful life, in which event the delivery hose 22 is directed to disposal and the pump 50 is operated in the discharge mode. When the vessel 42 is empty or at the startup of a fryer which needs a supply of fat or shortening, it is only necessary to place the solid block of fat, almost 1 cubic foot in size, in which form the fat is now furnished commercially, into the vessel 42 and to then turn the switch 90 to ON position. The block is then melted at a uniform temperature by the band heater 118 and, as soon as the fat is liquified, the switch 92 is turned to the discharge position and the heated liquid fat is pumped to the fryer.

At the end of each discharge cycle some residual fat will remain as a liquid film on the inside of the filter vessel 42, the nozzle 26 and the delivery and withdrawal hose 22. When the hose is placed in the position shown in FIG. 1, this fat drains to the sump connection 20 and normally open solenoid valve 21 at the low point of the system. The solenoid valve is connected directly to the power cable 88 so that it is automatically closed whenever the apparatus is connected with a power line, thus sealing the system against leakage when in operation. Upon disconnection of the apparatus from the power source, however, the valve 21 opens and residual melted fat drains therefrom into a suitable removable container 21" by way of an outlet pipe 21' which may also serve as a means to support the container from the floor.

The device is adapted to operate on a 115-volt, 60-cycle power source. The strip heaters and the band heater are selected to have such wattage that the temperature of the system will not go beyond a maximum of 355° F. Thus scorching or carbonizing of residual fat on the vessel walls or in the piping system is prevented. The band heater can be of 1,000-watt capacity and constructed of stainless steel. The strip heaters 112 and 114 are Nichrome V No. 30 strand wire with asbestos insulation and a braided glass sheath is provided over the outside. The input and discharge conduits 72 and 74 can be constructed of aluminum and any fittings and connectors can be of brass. The various elbows and the like can be made of cast iron. The pump 50 can be a gear pump and preferably the check valves are Stockton self-cleaning valves or the equivalent. So constructed, the device is durable, requires little servicing and is long lasting.

From this description it is seen that the invention provides a device for filtering a liquid medium including a vessel having a transverse filter element as a wall thereof, a drain conduit and in input conduit connected to opposite sides of the filter wall, and to each other at a common juncture or manifold, with check valves in each to allow the flow of fat out the drain conduit and into the input conduit, a combined delivery and withdrawal tube or hose connected to the juncture of the conduits, and pump means to cause fluid flow in either direction in the combined delivery and withdrawal tube. In another embodiment the heater means are provided as illustrated for the vessel, and the drain and input conduits or one or both of the check valves.

Although the respective positions of the parts in the cabinet 10 are not critical, best results are obtained with the pump 50 and sump connection 20 at the lowest part of the system with the juncture of the input and drain conduits thereabove and each of the self-cleaning check valves at substantially the same level. The system is arranged to avoid sharp corners or unheated areas wherein fat can collect and solidify, and the normally open solenoid valve at the sump connection assures a clean operable apparatus whenever use of the system is desired.

What is claimed is:

1. A device for filtering a liquid medium comprising;
 a. a vessel having a transverse filter element as a wall thereof,
 b. a drain conduit communicating at one end from one side of said filter element,
 c. a check valve in said drain conduit allowing fluid flow from said vessel,
 d. an input conduit communicating from the other side of said filter element to a juncture with the other end of said drain conduit,
 e. a check valve in said input conduit allowing fluid flow into said vessel,
 f. a delivery and withdrawal tube communicating with the juncture of said drain conduit and said input conduit,
 g. pump means for causing fluid flow in either direction in said delivery and withdrawal tube,
 h. means for heating the drain and input conduits continuously, and
 i. selectively operable means for heating said vessel.
2. A filtering device in accordance with claim 1 in which:
 a. thermostatically operated means is provided to indicate the fluidity of fat in the check valve in the input conduit.
3. A filtering device in accordance with claim 2 in which:
 a. means are provided to heat the check valve in said drain conduit.
4. A filtering device in accordance with claim 1 including:
 a. a sump connection at the low point of the drain and input conduit juncture to receive residual melted fat draining from the inside surface of said vessel and the delivery and withdrawal tubes for discharge of said fat from the filtering device,
 b. a normally open solenoid valve leading from said sump connection for controlling discharge of melted fat therefrom, and
 c. means for closing said solenoid valve when the filtering device is in operation.
5. A filtering device according to claim 4 including:
 a. a normally open solenoid valve leading from said sump connection for controlling discharge of melted fat therefrom.
6. A filtering device in accordance with claim 1 in which:
 a. said filter element comprises a bottom wall of the vessel, and
 b. the means to heat said vessel comprises a resistance-type band heater encircling the vessel above said filter element.
7. A filtering device in accordance with claim 1 in which:
 a. control means are provided including
 b. means to indicate the actuating of the heating means,
 c. means to selectively reverse the pump means, and
 d. means to indicate the temperature of the liquid medium.

* * * * *